United States Patent
Meister et al.

(10) Patent No.: US 8,205,987 B2
(45) Date of Patent: Jun. 26, 2012

(54) METHOD FOR OPTIMIZING A SPECTACLE LENS FOR THE WAVEFRONT ABERRATIONS OF AN EYE AND LENS

(75) Inventors: Darryl Meister, Olathe, KS (US); Timo Kratzer, Aalen (DE); Jesús Miguel Cabeza Guillén, Aalen (DE); Ray Steven Spratt, Petaluma, CA (US); Markus Welscher, Aalen (DE); Gerhard Kelch, Aalen (DE); Helmut Wietschorke, Aalen (DE)

(73) Assignees: Carl Zeiss Vision Inc., Petaluma, CA (US); Carl Zeiss Vision GmbH, Aalen (DE)

( * ) Notice: Subject to any disclaimer, the term of this patent is extended or adjusted under 35 U.S.C. 154(b) by 246 days.

(21) Appl. No.: 12/763,716

(22) Filed: Apr. 20, 2010

(65) Prior Publication Data

US 2011/0255052 A1 Oct. 20, 2011

(51) Int. Cl.
*G02C 7/02* (2006.01)
(52) U.S. Cl. ......... 351/177; 351/159
(58) Field of Classification Search ......... 351/177, 351/159
See application file for complete search history.

(56) References Cited

U.S. PATENT DOCUMENTS

| | | | |
|---|---|---|---|
| 6,089,713 A | 7/2000 | Hof et al. | |
| 7,063,421 B2 | 6/2006 | Wehner et al. | |
| 2005/0105047 A1* | 5/2005 | Smitth et al. | 351/177 |
| 2007/0121064 A1* | 5/2007 | Norrby et al. | 351/177 |
| 2007/0201001 A1* | 8/2007 | Dai | 351/177 |
| 2007/0279586 A1 | 12/2007 | Jethmalani et al. | |
| 2009/0015787 A1 | 1/2009 | Guillen et al. | |

OTHER PUBLICATIONS

W. Singer et al., "Handbook of Optical Systems", vol. 2, Wiley-VCH Publishing; 2005; pp. 211-231.

* cited by examiner

*Primary Examiner* — Jordan Schwartz
(74) *Attorney, Agent, or Firm* — Harness, Dickey & Pierce, P.L.C.

(57) ABSTRACT

The current invention is directed to a method for designing an ophthalmic lens element, the method comprising the steps of determining a wavefront aberration of an eye in a reference plane, wherein the wavefront aberration of the eye can be described by a first series of polynomials of ascending order up to a first specific order and corresponding first coefficients; determining a first vision correction of a second specific order; determining at least one specific point over an aperture of the adapted ophthalmic lens element; determining a high-order wavefront aberration in the reference plane for each specified point of the adapted ophthalmic lens element, wherein the high-order wavefront aberration can be described by a third series of polynomials of ascending order above the second specific order up to and including the first specific order and corresponding third coefficients; and determining a second vision correction of the second specific order.

14 Claims, 5 Drawing Sheets

METHOD FOR OPTIMIZING A SPECTACLE LENS FOR THE WAVEFRONT ABERRATIONS OF AN EYE AND LENS

BACKGROUND OF THE INVENTION

The current invention relates to a method for designing an ophthalmic lens element, the method comprising the steps of determining a wavefront aberration of an eye to be minimized in a reference plane, wherein the wavefront aberration of the eye can be described by a first series of polynomials of ascending order up to a first specific order and corresponding first coefficients, and determining a first vision correction of a second specific order to obtain an adapted ophthalmic lens element.

Further, the current invention relates to a method for manufacturing an ophthalmic lens element comprising the steps of the method for designing an ophthalmic lens element.

Furthermore, the current invention is related to a computer program product for carrying out the steps of the aforementioned methods.

Ophthalmic lenses for vision correction are well-known in the state of the art for hundreds of years. They have been used by opticians, optometrists and ophthalmologists for correcting nearsightedness and farsightedness by using concave and convex lenses, respectively, as well as for correcting presbyopia using multifocal lenses.

Wavefront aberrations are the result of differences in optical path length between the ideal wavefront that would result in a perfect focus through an optical system, i.e. an eyeglass and the eye, and the aberrated wavefront that is produced by the actual optical system. Wavefront aberrations are often categories by their radial order, which indicates the dependence of the aberration on pupil size. The optical components of the human eye suffer from both "low-order" and "high-order" wavefront aberrations. The low-order aberrations of interest to the correction of vision are actually a subset of the low-order aberrations, referred to as the "second-order" wavefront aberrations. Second-order aberrations vary as a function of the square of the distance from the center of the pupil or aperture. These wavefront aberrations are typically corrected with an eyeglass prescription that includes a spherical power component, a cylindrical power component and an axis component that describes the orientation of the cylindrical power.

High-order aberrations represent wavefront aberrations but vary as a cubic function or higher of the distance from the center of the pupil or aperture. The high-order aberrations of the eye include aberrations such as, for example, coma, trefoil and spherical aberrations. Although these aberrations are often smaller in magnitude than the low-order aberrations, high-order aberrations of the eye can also degrade vision quality and limit visual performance. It is possible to improve vision quality by correcting the high-order aberrations of the eye in addition to the low-order aberrations. The eye examination procedure for traditional eyeglass prescriptions, however, only yields a correction that minimizes the low-order aberration of the eye. Correcting the high-order aberrations of the eye is not practical with ophthalmic lenses, because more significant low-order wavefront aberrations are introduced as the eye rotates behind the lens.

Moreover, ophthalmic lenses with refracted wavefront profiles that depart from a section of a perfect sphere or toric surface also produce various high-order wavefront aberrations. High-order aberrations may be produced under certain circumstances by the refraction of light through certain regions of lenses with spherical or toric surfaces, including symmetrical optical systems that suffer from classic Seidel spherical aberration or coma. Moreover, high-order aberrations may be routinely produced by the lens when at least one surface of the lens has non-zero third partial derivatives. This includes any lens with a surface that varies smoothly in curvature, including but not limited to single vision lenses, spherical lenses and progressive additional lenses. In particular, progressive additional lenses produce significant coma and trefoil within the progressive corridor and at the boundaries between the central viewing zones of the lens and the peripheral regions. Both low- and high-order aberrations are unavoidable in certain areas of progressive additional lenses due to the use of blending regions that provide a smooth change in addition power without visible lines of demarcation.

The wavefront aberrations produced by an ophthalmic lens interact with the wavefront aberrations of the eye. Aberration coupling occurs that can either improve or degrade vision quality through different regions of the lens, depending upon the low- and high-order aberrations present in the eye and through the ophthalmic lens. Traditionally, however, ophthalmic lenses have been designed to minimize only the magnitude of the low-order aberrations produced by both the eye and the ophthalmic lens. This is due to the inability heretofore of measuring the high-order wavefront aberrations of the eye, prior to the advent of commercially available wavefront sensors; the inability of correcting the high-order aberrations of the eye with an ophthalmic lens without introducing more significant low-order wavefront aberrations; and to the inability heretofore of machining ophthalmic lens surfaces of suitable complexity, prior to the advent of modern free-form surfacing techniques.

Although ophthalmic lenses cannot eliminate high-order wavefront aberrations without introducing additional aberrations, it is nevertheless possible to improve vision quality with ophthalmic lenses by minimizing the net effect upon vision of the combined optical interaction between the low- and high-order wavefront aberrations of the eye when determining the low-order eyeglass correction. Ophthalmic lenses are presently available with low-order eye glass corrections that have been manipulated to account for the effects of the high-order aberrations of the eye. For example, similar methods are disclosed in US patent application 2007/0279586 A1 and US patent application 2009/0015787 A1. These ophthalmic lenses provide the wearer with a "wavefront-optimized" vision correction that has had the spherical power component, cylindrical power component and cylindrical axis manipulated in order to improve vision quality based upon wavefront aberration measurements from a wavefront sensor.

Recently, ophthalmic lenses have also been introduced that seek to minimize the high-order aberrations produced by only the lens at least within the mathematical constraints of progressive addition surfaces, although this will not improve the maximum potential vision quality of the wearer. A similar method is, for example, disclosed in U.S. Pat. No. 7,063,421.

The high-order wavefront aberrations of the human eye vary significantly within the population. Further, the high-order wavefront aberrations across ophthalmic lenses with significant changes in power, such as progressive addition lenses, also vary significantly over the lens aperture. It is possible, however, to manipulate the optics of an ophthalmic lens for a given eyeglass wearer through a suitable mathematical optimization process prior to fabrication using a free-form production method which is, for example, suggested in U.S. Pat. No. 6,089,713. Further, it is possible to estimate vision quality by assessing wavefront aberrations.

Therefore, it is possible to optimize the visual performance through different zones of an ophthalmic lens when the wavefront aberrations of the eye and the original ophthalmic lens design are both known.

The low-order refractive power of an ophthalmic lens element normally varies as a function of viewing angle both as a result of changes across one or more lens surfaces and as a result of astigmatism introduced by the oblique refraction of incident light. A typical optical design process seeks to preserve as closely as possible the intended low-order eyeglass correction for the wearer as the wearer gazes over the lens aperture at least within the inherent mathematical limitations of the lens design. In particular, progressive addition lens elements possess regions over the lens aperture in which it is not possible to provide the intended low-order eyeglass correction due to the presence of significant aberrations in blending regions of the surface.

Ophthalmic lens elements can produce high-order aberrations across the lens aperture as well, which may result from the refraction of light at wide field angles or from variations in curvature across one or more of the lens surfaces. For instance, because progressive lens elements rely on non-zero third derivatives in order to produce a smooth change in addition power over the lens aperture, the high-order aberrations of a progressive lens element vary as a function of the mixed partial derivatives of the progressive surface. Further, the high-order aberrations produced by a progressive lens are constrained primarily by the distribution of power and astigmatism over the lens surface, which represents a fundamental characteristic of the lens design. High-order aberrations referred to as "coma" ($Z_6$ and $Z_9$) and "trefoil" ($Z_7$ and $Z_8$) in the Zernike representation of high-order aberrations are directly influenced by the mixed partial derivatives of an ophthalmic lens surface described by a surface height function Z. The expansion of the Zernike polynomials can, for example, be derived from Gross et al., "Handbook of Optical Systems", Vol. 1 to 6, WILEY-VCH Publishing, Weinheim, 2007, ISBN: 978-3-527-40382-0".

In ophthalmic lens design, the intended or "target" distribution of low-order wavefront aberrations is typically specified. This distribution generally represents the ideal optical performance of the lens design for a particular combination of eyeglass prescription powers and fitting parameters. A typical optimization process seeks to achieve the desired distribution of optical powers as closely as possible by manipulating one or more continuously smooth surfaces of an ophthalmic lens element. At multiple points across the lens aperture, differences in optical performance between the modeled ophthalmic lens element and the target distribution are assessed using computer ray tracing for an assumed position of wear, which represents the position of the fitted lens on the wearer. During a typical ray tracing procedure, the refraction through the lens element of a quantity of rays from a specified object point, sufficient to characterize the wavefront aberrations of the lens up to the chosen order, are calculated. Ideally, these rays should all converge at the ideal focal plane of the eye associated with the object distance, although this is frequently not mathematically possible at all points across the lens aperture.

Typically, "merit functions" or least-square solutions representing the total magnitude of optical aberrations at these points are minimized at each of the specified points across the lens aperture using mathematical optimization and modeling techniques, such as finite element analysis. Further, these merit functions or the individual terms of these merit functions may also be weighted differently over the lens aperture in order to maximize visual performance in certain regions of the lens, wherein vision quality is most critical, or to minimize optimization in regions of the lens wherein certain optical aberrations are unavoidable due to the nature of the lens design. Common optimization techniques can also be derived from Gross et al. cited above.

In the current state of the art, these merit functions seek only to improve the performance of the ophthalmic lens element using a single, low-order (second-order) vision correction, or eyeglass prescription, originally specified by the eye care professional. Differences from this low-order single vision correction are therefore minimized over critical regions of the lens. Additional optimization terms may be incorporated in the merit function to minimize gradients of power (or astigmatism) or other optical attributes in order to reduce image swim or otherwise improve visual performance. Although it has been proven that the high-order aberrations of the eye cannot be corrected without introducing significant low-order aberrations of greater magnitude, visual performance can be improved by accounting for these aberrations when determining the traditional low-order vision correction or eyeglass prescription. Further, when an ophthalmic lens element introduces high-order aberrations that vary across the lens aperture, the ideal low-order vision correction also varies as a function of position over the lens.

Therefore, it is an object of the present invention to minimize the impact of the combined high-order aberrations produced by both the eye and the ophthalmic lens element over the lens aperture by accounting for the interaction between the high-order aberrations of the eye, as derived from measurements by an aberrometer or wavefront sensor, and the high-order aberrations of the ophthalmic lens element over the lens aperture.

It is a further object of the present invention to minimize the low-order wavefront aberrations of the ophthalmic lens element over specified regions of the lens aperture in addition to the low-order aberrations of the eye, traditionally eliminated by ophthalmic lens elements providing the desired spherical or sphero-cylindrical vision corrections.

Additionally, it is an object of the present invention to maximize vision quality over a range of viewing conditions, including ambient light levels or vary pupil sizes, by modifying the low-order vision correction to further improve vision quality in the presence of high-order wavefront aberrations within the eye and, more specifically, to improve the net vision quality obtained by the entire lens-eye optical system by accounting for the optical interaction between the high-order wavefront aberrations of the eye and the high-order aberrations produced by the ophthalmic lens element over the lens aperture.

SUMMARY OF THE INVENTION

According to a first aspect of the invention, there is provided the initially identified method for designing an ophthalmic lens element further comprising the steps of determining at least one specified point over an aperture of the adapted ophthalmic lens element, determining a higher-order wavefront aberration in the reference plane for each specified point of the adapted ophthalmic lens element, wherein the high-order wavefront aberration can be described by a third series of polynomials of ascending order above the second specific order up to and including the first specific order and corresponding third coefficients, determining a second vision correction of the second specific order for each of the specified points to obtain an optimized ophthalmic lens element based on the first vision correction up to and including the second specific order and based on combined first and third coefficients above the second specific order and up to and including the first specific order.

The present invention describes a method of optical optimization that seeks to further improve visual performance by minimizing the effect of the convolution of the various high-order wavefront aberrations of the eye and the comparable high-order aberrations of the lens element in addition to the low-order aberrations currently corrected by the ophthalmic lens element. Moreover, because the high-order aberrations of an ophthalmic lens element will typically vary significantly over the lens aperture, the high-order aberrations of the ophthalmic lens element are calculated at one or more points over the lens aperture in the present invention in order to provide an improved visual performance for different angles of view. When utilized in conjunction with the coefficients of the low-order aberration polynomials derived from the first low-order vision correction, the combined high-order coefficients of the lens and eye now afford a sufficiently complete description of the total wavefront aberrations of the lens-eye system at each point over the lens aperture, up to the desired total number of aberration polynomials or the first specific order. Using metrics methods of vision quality, for example as described in Gross et al. as cited above, that can be employed to predict visual performance based upon wavefront aberrations, an optimized low-order vision correction is then determined at each specified point using the newly combined high-order coefficients and the original low-order coefficients of the first vision correction.

This new wavefront-optimized low-order vision correction comprises a spherical power component, a cylindrical power component and a cylindrical axis that have calculated to maximize vision quality by minimizing the net effect of the combined wavefront aberrations of the lens-eye system at each of the specified points over the lens aperture. A new distribution of desired optical powers is therefore determined, which represents the ideal distribution of wavefront-optimized low-order vision corrections of the lens aperture. This distribution serves as the target distribution for use within the optical optimization process of the actual ophthalmic lens element.

According to a second aspect of the invention, there is provided the initially identified method for manufacturing an ophthalmic lens element comprising the aforementioned method steps and, further, the step of producing the ophthalmic lens element.

According to a third aspect of the invention, there is provided a computer program product comprising program code means for carrying out the steps of the methods according to the first and the second aspect of the current invention, in particular when said computer program product is carried out on a computer.

In other words, at one or more specified points over the lens aperture, the coefficients of the wavefront aberration polynomials of the ophthalmic lens element $L_j$ are combined mathematically with the coefficients of the equivalent polynomials of the eye $E_j$, at corresponding x and y coordinates over a common reference plane, through simple addition in order to determine the combined aberration coefficient of the lens-eye optical system $S_j$ for each aberration polynomial specified by an index j up to and including an aberration polynomial with a specified maximum index n:

$$S_j(x,y)=L_j(x,y)+E_j(x,y), j \leq n$$

wherein each index j corresponds to a particular polynomial function from the set of, for example, Zernike polynomials enumerated using the Optical Society of America's standard single indexing scheme and the maximum index n corresponds to the Zernike polynomial with the highest radial order and angular frequency chosen for the optimization.

Preferably, the maximum index n is chosen to include low-order aberration polynomials ($j \leq 5$) and at least one or more high-order aberration polynomials ($j \geq 6$); ideally, the maximum index n should be chosen such that the specified series of Zernike polynomial functions up to and including the maximum index n sufficiently characterizes the wavefront aberration of the lens-eye system to a suitable level of accuracy.

Further, if a given aberration coefficient of the ophthalmic lens element is either generally negligible for certain ophthalmic lens elements or otherwise ignored for the sake of optimization efficiency, the combined aberration coefficient of the lens-eye system $S_j$ for that particular aberration polynomial simplifies to:

$$S_j(x,y)=E_j(x,y).$$

In a preferred embodiment of the method according to the first aspect of the invention, the step of determining a first vision correction can comprise the steps of determining a wavefront aberration of the ophthalmic lens element in the reference plane as a first target distribution so as to correct the wavefront aberration of the eye, wherein the wavefront aberration of the ophthalmic lens element can be described by a second series of polynomials of ascending order up to a second specific order and corresponding second coefficients, wherein the second specific order is equal or lower than the first specific order and adapting the ophthalmic lens element so as to match the first target distribution as closely as possible.

By this, a sufficient first vision correction can be achieved which forms the basis for the optimization process using combined first and third coefficients to describe high-order wavefront aberrations.

In a further preferred embodiment, the step of determining a second vision correction comprises the step of determining a combined high-order wavefront aberration of a combined lens-eye system in the reference plane for each specified point, wherein the combined high-order wavefront aberration can be described by a fourth series of polynomials of ascending order above the second specific order and up to and including the first specific order and corresponding fourth coefficients, wherein the fourth coefficients are equal to the sum of corresponding first and third coefficients.

At one or more specified points over the lens aperture, the coefficients of the high-order aberration polynomials of the ophthalmic lens element $L_j$ may be combined mathematically with the coefficients of the equivalent high-order aberration polynomials of the eye $E_j$, corresponding x and y coordinates over a common reference plane, through simple addition in order to determine the combined high-order aberration coefficients of the lens-eye optical system $S_j$ for each aberration polynomial specified by an index j up to and including an aberration polynomial with a specified maximum index (or first specific order) n:

$$S_j(x,y)=L_j(x,y)+E_j(x,y), 6 \leq j \leq n,$$

wherein it is assumed that the first six wavefront aberration polynomials ($0 \leq j \leq 5$) represent low-order aberrations. However, an arbitrary number can be chosen for n.

Further, the second vision correction preferably comprises the steps of determining for each specified point a combined wavefront aberration comprising the combined high-order wavefront aberration and a combined low-order wavefront aberration, determining a final wavefront aberration for each specified point of the ophthalmic lens element in the reference plane as a second target distribution so as to correct the combined wavefront aberration of the respective specified point, wherein the final wavefront aberration can be described by a fifth series of polynomials of ascending order up to the second specific order, and optimizing the ophthalmic lens element so as to match the second target distribution as closely as possible.

By this, an optimized ophthalmic lens element providing a vision correction of the second specific order can be achieved. Of course, it might not be possible to match the second target distribution exactly in each of the specified points. However, by using one of the known optimization techniques such as least-square solutions, the net aberration of the actual ophthalmic lens element can be minimized. Further, specific terms of the least-square solutions, for example, might be weighted due to their position over the lens aperture to account for the natural field of view.

Preferably, the combined low-order wavefront aberration corresponds to the results of the first vision correction for each of the specified points.

Generally, the original low-order vision correction combined with the high-order coefficient of the added lens-eye system provide for a sufficiently complete description of the total wavefront aberration at each specified point over the lens aperture.

Preferably, the second specific order is second order.

In particular, the first vision correction may be conducted using a single second-order vision correction.

By this, the first vision correction can be conducted as commonly known in ophthalmics. A common eyeglass prescription is first applied to the ophthalmic lens element and then optimized according to the steps of the current invention to account for high-order wavefront aberrations.

The wavefront aberrations may be described by any suitable mathematical fitting functions, including but not limited to one of the group consisting of a Zernike polynomial series, a Taylor polynomial series and a Chebyshev polynomial series.

Generally, the wavefront aberrations of the eye and the ophthalmic lens element may be characterized by any arbitrary measurement of wavefront error including but not limited to the aforementioned common fitting functions.

The step of determining the second target distribution may involve any suitable mathematical functions, including but not limited one of the group consisting of pupil plane metrics, point spread function metrics and optical transfer metrics.

Generally, the optical optimization may involve any arbitrary measurement of vision quality to arrive at the wavefront-optimized low-order vision correction utilized at each specified point including but not limited to the aforementioned metrics.

The wavefront aberration of the eye can be determined by using a wavefront sensor or an aberrometer, for example a Shack-Hartmann sensor.

The combined high-order wavefront aberration in the reference plane for each specified point of the adapted ophthalmic lens element may be determined by ray tracing or wave tracing a model of the eye and the ophthalmic lens element.

Because the method described by the present invention seeks to minimize the effect of the combined interaction of the low- and high-order wavefront aberrations of the eye and the ophthalmic lens element, both aberrations must be determined. The low- and high-order aberrations of the eye are measured using a wavefront sensor or aberrometer. The low- and high-order aberrations of the ophthalmic lens element are typically determined by ray tracing a model of the eye and lens element in its intended position of wear in order to calculate the difference between the focus of incident light through the ophthalmic lens element and the ideal focal plane of the eye at the specified points over the lens aperture.

During the optimization process, compensation for chromatic aberrations of the eye and other physiological factors, such as the Stiles Crawford effect, is also possible.

Any arbitrary number of points may be specified and determined. For example, the number of specified points may be 5, 10, 25, 100, 1000 or 10,000. Alternatively, the points may be determined from one or more functions of surface position.

The method of the current invention may be apply to any ophthalmic lens form, including but not limited to single vision lens elements, multifocal lens elements and progressive lens elements.

Further, it is equally possible to make small modifications to the new, wavefront-optimized low-order vision correction in order to reconcile differences from the original eyeglass prescription that may have been arrived at in order to improve binocular vision function. For regions over the lens aperture associated with vision at proximal distances, the non-symmetrical low- and high-order aberrations of the eye may be modified to account for the cyclo-rotation or Listing's rotation of the eye.

The method for manufacturing an ophthalmic lens element according to the second aspect of the current invention may preferably be further characterized in that the ophthalmic lens element is produced using a free-form surfacing.

Because the optimized surface or surfaces will generally lack point and axial symmetry, the ophthalmic lens element must be machined and polished using free-form surfacing or a similar production method that allows the immediate production of complex lens surfaces that lack point or axial symmetry.

It is understood that the features of the invention mentioned above and those yet to be explained below can be used not only in the respective combinations indicated, but also in other combinations or in isolation, without departing from the scope of the present invention.

BRIEF DESCRIPTION OF THE DRAWINGS

Exemplary embodiments of the invention are represented in the drawing, they will be explained in more detail in the description below. In the drawings.

DESCRIPTION OF PREFERRED EMBODIMENTS

Figure 1:
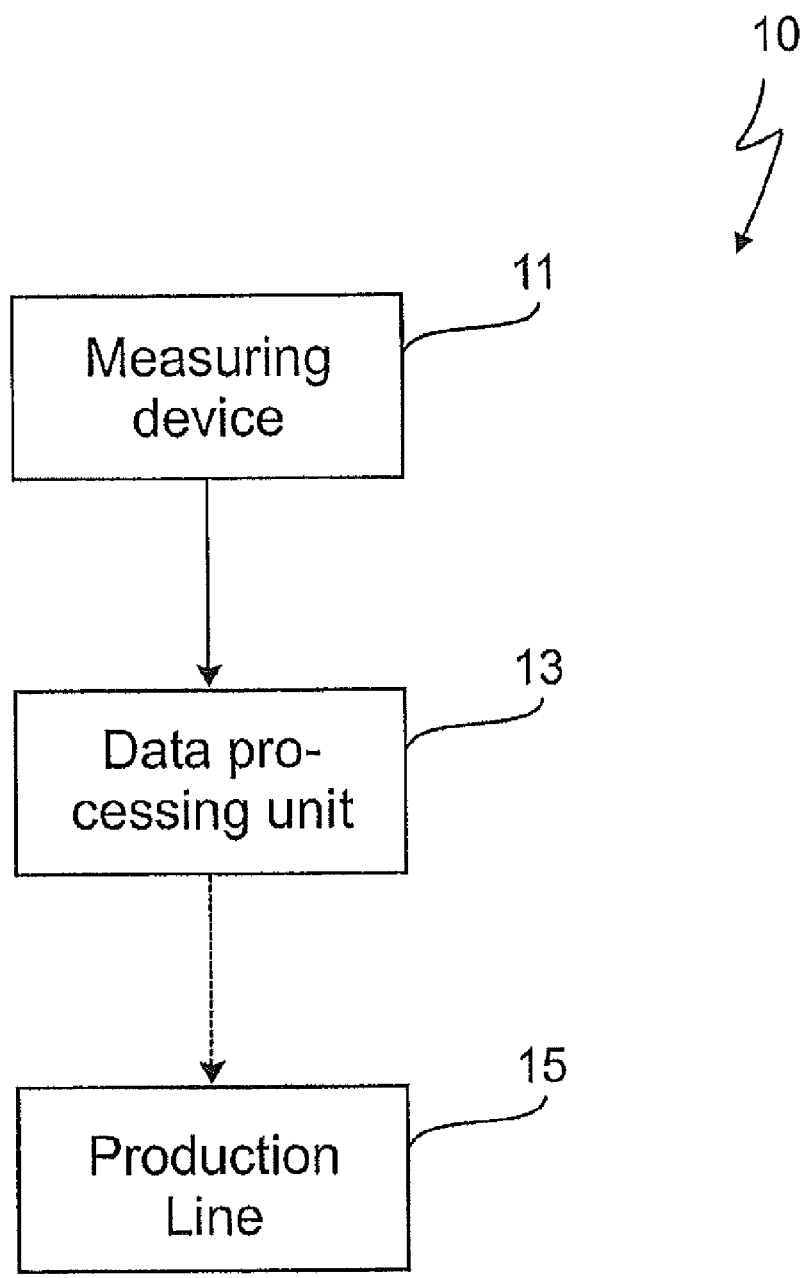
FIG. 1 is an example of a system to carry out the current invention.

Referring to FIG. 1, a system 10 for carrying out the methods according to the current invention is shown. The system 10 may be used for designing an ophthalmic lens element or for designing and producing an ophthalmic lens element.

The system 10 comprises a measuring device 11 used for determining a wavefront aberration of an eye of a person for whom an eyeglass is to be produced. The measuring device may be a commonly known wavefront sensor or aberrometer, such as an wavefront sensor according to Shack-Hartmann.

Data obtained by the measuring device is then transferred into a data processing unit 13 which is adapted to conduct a method for a designing an ophthalmic lens element according to the current invention, for example by applying a computer program product according to the current invention. Generally, the data processing unit 13 may be a commonly known computer system.

The measuring device 11 and the data processing unit 13 may be directly connected via a cable connection but also a wireless connection may be applied. The data obtained by the measuring device 11 may be transferred to the data processing unit 13 via the network connection, for example via the Internet or may be transferred from the measuring device to the data processing unit via a computer-readable medium, so that in this case no physical connection between the measuring device 11 and the data processing unit 13 has to be established.

Further, a production line 15 is provided to produce the once designed ophthalmic lens element. The data processing unit 13 may be directly connected to the production line 15 to control the production line 15 to produce the ophthalmic lens element according to the designing process conducted by the data processing unit 13. Of course, the data processing unit 13 and the production line 15 may also be connected wirelessly and the data of the designed ophthalmic lens element may also be transferred to the production line, for example, stored on a computer-readable medium.

Figure 2:
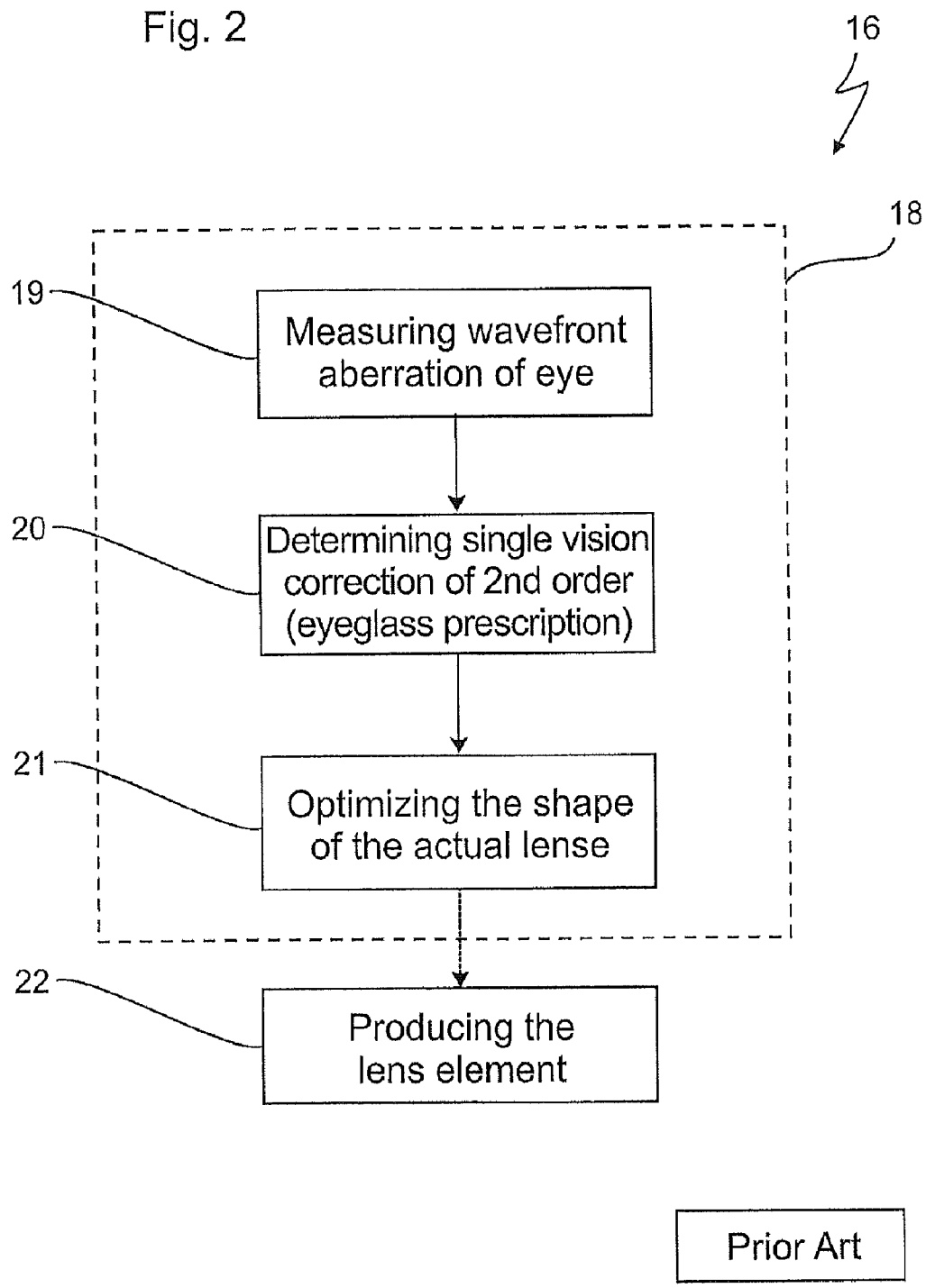
FIG. 2 is a method for designing and producing a lens element according to the prior art.

Referring now to FIG. 2, there is shown a manufacturing method 16 according to the prior art.

The manufacturing method 16 comprises a designing method 18 according to the prior art. The designing method 18 comprises three steps conducted in the following chronological order.

First, in a step 19 of measuring the wavefront aberration of an eye to be corrected is determined. In the prior art, only wavefront aberrations up to the second order, that is distortion and astigmatism, are measured. Expanding the wavefront aberration into a Zernike polynomial series, only the first six Zernike coefficients for the image aberrations constant phase, distortion, defocus and astigmatism are determined.

Then a first vision correction 20 is conducted, in which a single vision correction of second order, the so-called eyeglass prescription, is determined for the whole lens aperture. This eyeglass prescription comprises a spherical power component, a cylindrical power component and a cylindrical axis.

This eyeglass prescription serves as a target distribution to be applied over the whole lens aperture. In a step 21 of optimization the shape of the actual ophthalmic lens element or of at least one surface of the ophthalmic lens element is determined to match the target distribution as closely as possible. However, in particular in the peripheral regions of the lens, depending upon the actual form of the ophthalmic lens element, it will not be possible to match the target distribution exactly over the whole lens aperture. Therefore, merit functions or least-square functions will be applied to minimize the deviation from the target distribution. Further, certain terms of the respective functions might be weighted according to vision characteristics.

After the actual shape of the ophthalmic lens element is determined in step 21, a step 24 of producing the ophthalmic lens element is conducted in which the final actual ophthalmic lens element is manufactured.

The steps 19, 20 and 21 form the designing method 18. Steps 19, 20 and 21 together with step 22 form the manufacturing method 16 according to the prior art.

Figure 3:
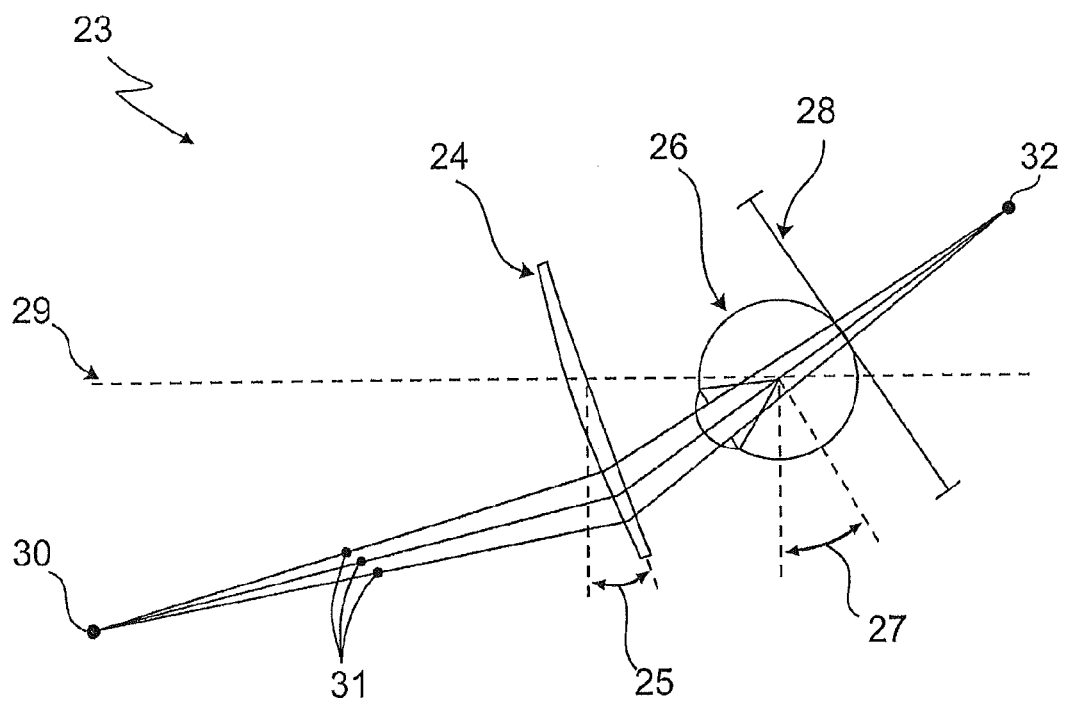
FIG. 3 is an example of a ray tracing method.

Referring now to FIG. 3, it is shown a ray tracing example 23.

An ophthalmic lens element 24 is tilted by an angle 25. Further, an eye 26 to be corrected is tilted by an angle 27. In the eye 26, a reference plane 28 is set, preferably in a focal plane of the eye 26.

The angles 25, 27 may be measured to a plane perpendicular to a horizontal plane 29, to the horizontal plane itself or in an arbitrary fashion. However, the angles 25, 27 should reflect the actual position of the eye 26 and the lens element 24 in a wearing position.

For an object point 30, a light path of a multitude of rays 31 through the ophthalmic lens element 24 and the eye 26 is calculated. By this, aberrations from an ideal picture point 32 in the reference plane 28 can be measured for each individual ray. The corresponding calculation can be conducted for a multitude of object points 30. By this, for specific points on the ophthalmic lens element 24, the aberration out of different viewing angles can be determined.

Instead of rays 31, also a wave consisting of multitude of parallel rays 31 can be calculated, to perform so-called wave tracing.

By this technique, it is however possible to calculate wavefront aberrations of a designed ophthalmic lens element 24.

Figure 4:
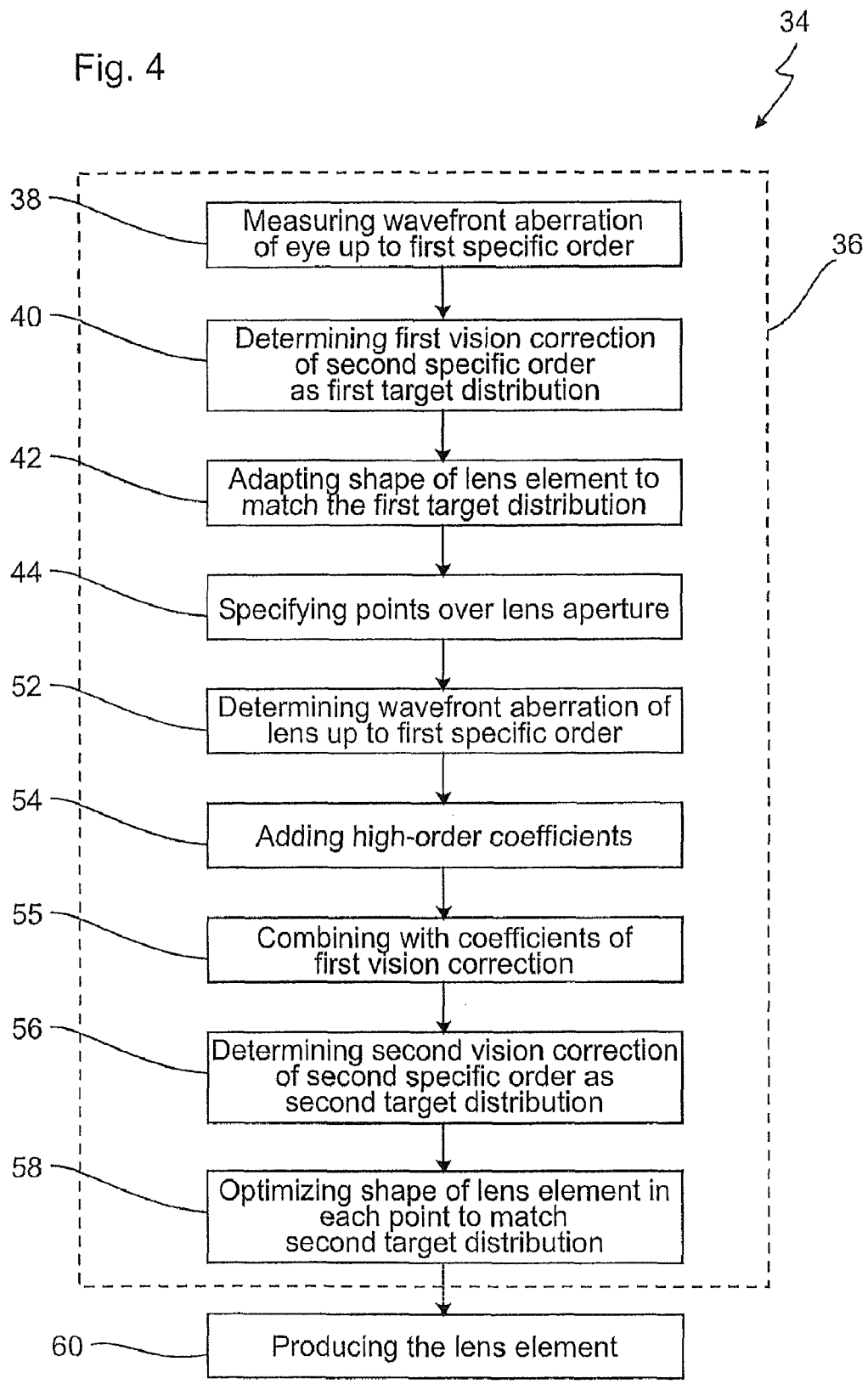
FIG. 4 is a designing method according to a first aspect of the current invention and a method for producing an ophthalmic lens element according to a second aspect of the current invention.

Referring now to FIG. 4, an exemplary embodiment of a manufacturing method 34 according to the current invention and a designing method 36 according to the current invention is shown.

The designing method 36 is shown as a flow chart diagram starting with a step 38 of measuring the wavefront aberration of the eye 26 to be corrected up to a first specific order. The first specific order may for example be the third order.

The corresponding aberrations of the eye 26 are determined and the aberration may be expanded as a Zernike polynomial series with corresponding polynomial terms corresponding to the image aberrations, wherein each polynomial term comprises a respective coefficient determined by the measuring step 38.

Subsequently, a first vision correction 40 is determined of a second specific order as a first target distribution. The method applied in this step corresponds to that of the prior art wherein a spherical power component, a cylindrical power component and a cylindrical axis as an eyeglass prescription to correct the wavefront aberrations up to the second specific order determined in step 38 are determined. Hence, in the exemplary embodiment, the second specific order is the second order. Therefore, in step 40 a single second-order eyeglass description is determined to correct the wavefront aberrations up to the second order as determined in step 38.

Then, the shape of the ophthalmic lens element 24 is virtually adapted to match the first target distribution determined in step 40 as closely as possible in step 42.

In step 44 a multitude of specified points of the lens aperture is determined. The points can be specified manually by an optician or be set automatically by the data processing unit 13 following a predetermined distribution.

Figure 5:
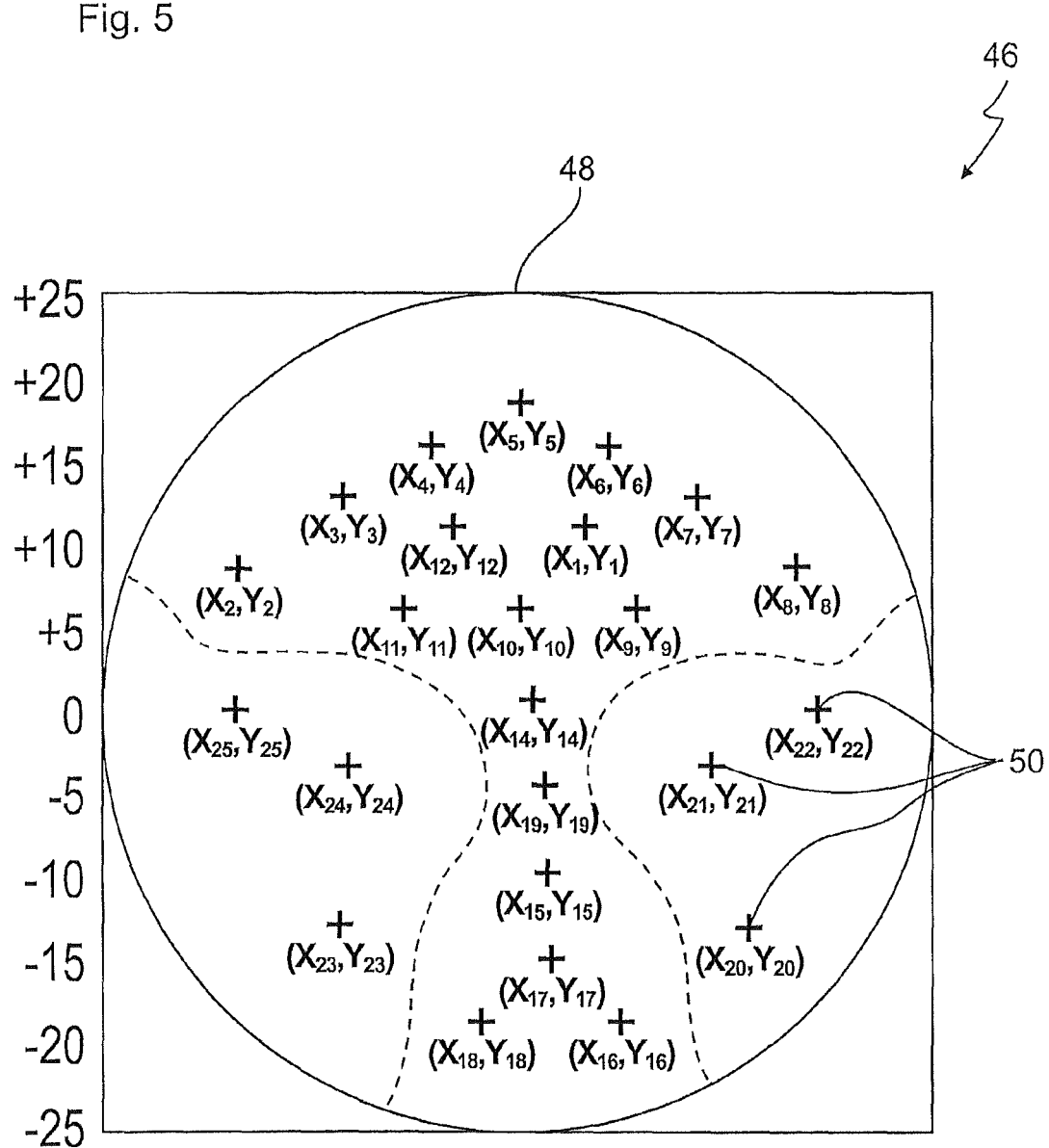
FIG. 5 is a sample allocation of specified points over a lens aperture.

Referring now to FIG. 5, a sample allocation 46 is shown. A lens aperture 48 may be described by a circle. In the lens aperture 48, a multitude of point 50 is specified. However, the points 50 are not necessarily equally spaced over the lens aperture 48 but may be set based upon characteristics of the human field of view. Further, the distribution of the points 50 may depend on the type of lens, i.e. if the lens is a single vision lens, a bifocal lens or a progressive lens, for example.

Referring back to FIG. 4, after the specified points 50 have been determined in step 44, a wavefront aberration of the ophthalmic lens element 24 adapted in step 42 is virtually determined by applying a ray tracing method, for example, as shown in FIG. 3. The corresponding aberrations may be expanded into corresponding Zernike polynomials with corresponding coefficients.

Now, the high-order coefficients are added in step 54. In the current example, the higher-order coefficients are coefficients of the polynomials of the third order. In step 54, the coefficients determined in step 52 and in step 48 are added to obtain the higher-order coefficients of the combined lens-eye system. Accordingly, a target distribution of aberrations can now be determined to optimize the eyeglass prescription taking into account these combined high-order aberrations.

In step 55, the obtained high-order coefficients from step 54 are combined with the low-order coefficients obtained by the first vision correction for each specified point 50.

The coefficients may be those determined in step 40 as the first target distribution. In this case the combined low-order coefficients for each specified point correspond to those of the eyeglass prescription and are, thus, the same in each specified point 50.

However, in an alternative embodiment, the corresponding low-order coefficients of the ophthalmic lens element obtained by the adapting step 42 are used. In this case, as the surface shape of the ophthalmic lens element 24 obtained in step 42 does not match the first target distribution exactly and each specified point 50 might then have a slightly different combined low-order coefficient as determined in step 42.

After this, a sufficient description of the wavefront aberration of the combined lens eye system is obtained.

In step 56, a second vision correction of second order is determined in each specified point as a second target distribution. This means, in each specified point the second-order vision correction as calculated in steps 40 and 42 is optimized so as to minimize the wavefront aberrations according to the current example not only up to the second order but up to third order based on the combined coefficients of the lens-eye system. By this, for each specified point an ideal second order vision correction comprising a spherical power component, a cylindrical power component and a cylindrical axis is determined. In other words, the vision correction obtained in steps 40, 42 is altered in specified points 50 to minimize high-order wavefront aberrations of the combined lens-eye system.

Afterwards in step 58, the actual shape of at last one surface of the ophthalmic lens element 24 is optimized in each specified point 50 to match the second target distribution determined in step 56 as closely as possible.

The method 36 for designing a lens element 24 is now concluded.

Subsequently, a step 60 of producing the lens element according to the shape determined in step 56 is to be conducted to conclude the manufacturing method 34 of the current invention.

What is claimed is:

1. A method for designing an ophthalmic lens element through the use of a non-transitory computer readable medium, the method comprising the steps of:
   determining a wavefront aberration of an eye in a reference plane, wherein the wavefront aberration of the eye can be described by a first series of polynomials of ascending order up to a first specific order and corresponding first coefficients;
   determining a first vision correction described by a second series of polynomials of a second specific order and corresponding second coefficients to obtain an adapted ophthalmic lens element;
   determining at least one specified point over an aperture of the adapted ophthalmic lens element;
   determining a high-order wavefront aberration in the reference plane for each specified point of the adapted ophthalmic lens element, wherein the high-order wavefront aberration can be described by a third series of polynomials of ascending order above the second specific order up to and including the first specific order and corresponding third coefficients; and
   determining a second vision correction of the second specific order for each of the specified points to obtain an optimized ophthalmic lens element based on the first vision correction up to and including the second specific order and based on combined first and third coefficients above the second specific order and up to and including the first specific order.

2. The method according to claim 1, wherein the step of determining a first vision correction comprises the steps of:
   determining a wavefront aberration of the ophthalmic lens element in the reference plane as a first target distribution so as to correct the wavefront aberration of the eye, wherein the wavefront aberration of the ophthalmic lens element can be described by a second series of polynomials of ascending order up to a second specific order and corresponding second coefficients, wherein the second specific order is equal or lower than the first specific order; and
   adapting the ophthalmic lens element so as to match the first target distribution as closely as possible.

3. The method according to claim 1, wherein the step of determining a second vision correction comprises the step of:
   determining a combined high-order wavefront aberration of a combined lens-eye system in the reference plane for each specified point, wherein the combined high-order wavefront aberration can be described by a fourth series of polynomials of ascending order above the second specific order and up to and including the first specific order and corresponding fourth coefficients, wherein the fourth coefficients are equal to the sum of corresponding first and third coefficients.

4. The method according to claim 3, wherein the step of determining a second vision correction further comprises the steps of:
   determining for each specified point a combined wavefront aberration comprising the combined high-order wavefront aberration and a combined low-order wavefront aberration;
   determining a final wavefront aberration for each specified point of the ophthalmic lens element in the reference plane as a target distribution so as to correct the combined wavefront aberration of the respective specified point, wherein the final wavefront aberration can be described by a fifth series of polynomials of ascending order up to the second specific order; and
   optimizing the ophthalmic lens element so as to match the target distribution as closely as possible.

5. The method according to claim 4, wherein the combined low-order wavefront aberration corresponds to results of the first vision correction for each of the specified points.

6. The method according to claim 1, wherein the second specific order is second order.

7. The method according to claim 6, wherein the first vision correction is conducted using a single second-order vision correction.

8. The method according to claim 1, wherein the wavefront aberrations are described by one of the following: a Zernike polynomial series, a Taylor polynomial series and a Chebyshev polynomial series.

9. The method according to claim 4, wherein the step of determining the target distribution involves one of the following: pupil plane metrics, point spread function metrics and optical transfer metrics.

10. The method according to claim 1, wherein the wavefront aberration of the eye is determined by using a wavefront sensor or an aberrometer.

11. The method according to claim 3, wherein the combined high-order wavefront aberration in the reference plane for each specified point of the adapted ophthalmic lens element is determined by ray tracing or wave tracing a model of the eye and the ophthalmic lens element.

12. A method for manufacturing an ophthalmic lens element comprising the steps of:
designing the ophthalmic lens element, the designing comprising the steps of:
determining a wavefront aberration of an eye in a reference plane, wherein the wavefront aberration of the eye can be described by a first series of polynomials of ascending order up to a first specific order and corresponding first coefficients;
determining a first vision correction described by a second series of polynomials of a second specific order and corresponding second coefficients to obtain an adapted ophthalmic lens element;
determining at least one specified point over an aperture of the adapted ophthalmic lens element;
determining a high-order wavefront aberration in the reference plane for each specified point of the adapted ophthalmic lens element, wherein the high-order wavefront aberration can be described by a third series of polynomials of ascending order above the second specific order up to and including the first specific order and corresponding third coefficients; and
determining a second vision correction of the second specific order for each of the specified points to obtain an optimized ophthalmic lens element based on the first vision correction up to and including the second specific order and based on combined first and third coefficients above the second specific order and up to and including the first specific order;
the method for manufacturing further comprising the step of:
producing the ophthalmic lens element.

13. The method according to claim 12, wherein the ophthalmic lens element is produced using free-form surfacing.

14. A non-transitory computer program product comprising program code means for carrying out the following steps for designing an ophthalmic lens element:
determining a wavefront aberration of an eye in a reference plane, wherein the wavefront aberration of the eye can be described by a first series of polynomials of ascending order up to a first specific order and corresponding first coefficients;
determining a first vision correction described by a second series of polynomials of a second specific order and corresponding second coefficients to obtain an adapted ophthalmic lens element;
determining at least one specified point over an aperture of the adapted ophthalmic lens element;
determining a high-order wavefront aberration in the reference plane for each specified point of the adapted ophthalmic lens element, wherein the high-order wavefront aberration can be described by a third series of polynomials of ascending order above the second specific order up to and including the first specific order and corresponding third coefficients; and
determining a second vision correction of the second specific order for each of the specified points to obtain an optimized ophthalmic lens element based on the first vision correction up to and including the second specific order and based on combined first and third coefficients above the second specific order and up to and including the first specific order.

* * * * *